(12) United States Patent
McCague et al.

(10) Patent No.: US 8,465,650 B2
(45) Date of Patent: Jun. 18, 2013

(54) SPA CALCIUM REMOVAL METHODS AND APPARATUS

(75) Inventors: Michael McCague, Escondido, CA (US); Jerry E. Rademan, Jacksonville, FL (US)

(73) Assignee: Watkins Manufacturing Corporation, Vista, CA (US)

( * ) Notice: Subject to any disclaimer, the term of this patent is extended or adjusted under 35 U.S.C. 154(b) by 486 days.

(21) Appl. No.: 12/762,496

(22) Filed: Apr. 19, 2010

(65) Prior Publication Data
US 2010/0294724 A1  Nov. 25, 2010

Related U.S. Application Data

(60) Provisional application No. 61/180,055, filed on May 20, 2009.

(51) Int. Cl.
*C02F 1/00* (2006.01)
(52) U.S. Cl.
USPC ........................................ 210/687; 210/167.1
(58) Field of Classification Search
USPC ............................................. 210/687, 167.11
See application file for complete search history.

(56) References Cited

U.S. PATENT DOCUMENTS

| | | | |
|---|---|---|---|
| 2,202,001 A * | 5/1940 | Austin | 210/282 |
| 4,608,247 A | 8/1986 | Heinig, Jr. | |
| 4,828,698 A | 5/1989 | Jewel | |
| 5,236,595 A * | 8/1993 | Wang et al. | 210/669 |
| 5,352,369 A | 10/1994 | Heinig, Jr. | |
| 5,660,802 A | 8/1997 | Archer et al. | |
| 5,772,896 A | 6/1998 | Denkewicz, Jr. et al. | |
| 5,779,913 A | 7/1998 | Denkewicz, Jr. et al. | |
| 5,855,777 A | 1/1999 | Bachand et al. | |
| 5,858,246 A | 1/1999 | Rafter et al. | |
| 6,019,893 A | 2/2000 | Denkewicz, Jr. et al. | |
| 6,165,358 A | 12/2000 | Denkewicz, Jr. et al. | |
| 6,200,487 B1 | 3/2001 | Denkewicz, Jr. et al. | |
| 6,254,894 B1 | 7/2001 | Denkewicz, Jr. et al. | |
| 6,461,498 B2 * | 10/2002 | Tseng | 210/87 |
| 6,627,074 B2 | 9/2003 | Lincke | |
| 6,761,827 B2 | 7/2004 | Coffey | |

(Continued)

FOREIGN PATENT DOCUMENTS

| | | |
|---|---|---|
| EP | 0269261 A1 | 1/1988 |
| JP | 2005-123924 A | 5/1993 |

(Continued)

OTHER PUBLICATIONS

Form PCT/ISA/210 in connection with PCT/US2010/031945 dated Dec. 24, 2010.

(Continued)

*Primary Examiner* — Chester Barry
(74) *Attorney, Agent, or Firm* — Greenberg Traurig LLP; Franklin D. Ubell

(57) ABSTRACT

Strong acid cation resins used alone or in combination with zeolite-based ion exchange resins are encapsulated in various water permeable polymer fabric bags of various geometries and thicknesses to reduce the calcium hardness levels during swimming pool and spa water fills. The resin bags are strategically placed in the pool or spa to allow water under pressure to flow through the ion exchange media to exchange calcium or magnesium ions with sodium or other harmless cations.

16 Claims, 7 Drawing Sheets

U.S. PATENT DOCUMENTS

| | | |
|---|---|---|
| 6,982,040 B2 | 1/2006 | Costa et al. |
| 7,067,056 B2 | 6/2006 | Collins |
| 7,147,786 B2 | 12/2006 | Costa et al. |
| 7,208,083 B2 | 4/2007 | Meritt-Powell |
| 7,211,176 B2 | 5/2007 | Hin et al. |
| 7,238,278 B2 | 7/2007 | Coffey et al. |
| 7,320,761 B2 | 1/2008 | Costa et al. |
| 7,398,138 B2 | 7/2008 | Emery et al. |
| 7,803,937 B2 * | 9/2010 | Yabusaki ............ 536/34 |
| 2004/0104163 A1 | 6/2004 | Leaverton |
| 2005/0067339 A1 | 3/2005 | McClure |
| 2008/0000837 A1 * | 1/2008 | Ayats et al. ............ 210/687 |
| 2008/0053910 A1 * | 3/2008 | Ayats et al. ............ 210/687 |

FOREIGN PATENT DOCUMENTS

| | | |
|---|---|---|
| JP | 08-001155 A | 1/1996 |
| JP | 3058508 U9 | 3/1999 |
| JP | 2005-136968 A | 5/2002 |
| JP | 2003-094050 A | 4/2003 |
| JP | 2003-190965 A | 7/2003 |
| JP | 2008-154656 A | 7/2008 |
| KR | 10-2004-0017073 A | 2/2004 |

OTHER PUBLICATIONS

Form PCT/ISA/237 in connection with PCT/US2010/031945 dated Dec. 24, 2010.

Form PCT/ISA/210 in connection with PCT/US2010/031948 dated Jan. 20, 2011.

Form PCT/ISA/237 in connection with PCT/US2010/031948 dated Jan. 20, 2011.

Form PCT/ISA/210 in connection with PCT/US2010/031947 dated May 26, 2011.

Form PCT/ISA/237 in connection with PCT/US2010/031947 dated May 26, 2011.

* cited by examiner

SPA CALCIUM REMOVAL METHODS AND APPARATUS

This application claims the Paris Convention priority of U.S. Provisional Application No. 61/180,055 entitled "Spa Calcium Removal Methods and Apparatus," filed May 20, 2009, the contents of which are hereby incorporated by reference in their entirety.

FIELD

The subject disclosure relates to pools and spas and more particularly to a method and apparatus for reducing calcium hardness levels in pools and spas during or after the water filling process.

DESCRIPTION OF RELATED ART

Portable spas have become quite popular as a result of their ease of use and multiplicity of features such as varied jet and seating configurations. One area where the inventors have recognized that ease of use could be enhanced is the area of maintaining proper water chemistry and sanitation.

SUMMARY

The following is a summary description of illustrative embodiments of the invention. It is provided as a preface to assist those skilled in the art to more rapidly assimilate the detailed design discussion which ensues and is not intended in any way to limit the scope of the claims which are appended hereto in order to particularly point out the invention.

In an illustrative embodiment, an ion exchange resin-filled bag is strategically placed in the pool or spa so the mineral-laden water, preferably under pressure, can flow through the resin-filled bag, allowing for exchange of the higher levels calcium (Ca) and/or magnesium (Mg) ions with safe and harmless Sodium (Na) or other ions. The resin-filled bag may also be placed in the water and calcium removed over time through diffusion through the bag. One embodiment allows for a controlled reduction of calcium hardness to levels necessary for proper balanced water (0 ppm to 250 ppm). The depleted ion exchange resin bag can be regenerated for further Ca hardness reduction by use of a 10% sodium chloride aqueous solution rinse. In other embodiments, various ion exchange resins can be used to reduce or remove harmful metal ions such as iron, copper and manganese, while also still reducing calcium hardness.

DETAILED DESCRIPTION

Many chemical elements found in municipal and well-water sources can cause physical and chemical damages to pools and spas. Some water sources contain metals such as iron, copper and manganese that can stain a pool or spa. Other elements such as calcium and magnesium can cause scale to build up on pool and spa surfaces and equipment. Heavy scale caused by excessive calcium hardness build-up can clog and harm equipment such as heaters, pumps, blowers, jets, filters, chlorinators or other sanitizing equipment, as well as pool or spa returns. Also, if pool or spa calcium hardness levels are too high (higher than 250 ppm), the overall water chemistry balance will be deleteriously affected, disrupting the ability to properly maintain the water's pH, total alkalinity, chlorine and/or other sanitizer levels. Conversely, calcium hardness levels that are too low can also disrupt the water chemistry balance and actually begin to leach calcium out of plaster and concrete pool and spa finishes and surfaces.

The illustrative embodiments enable a pool or spa owner to either fill a pool or spa with proper calcium hardness levels (0 to 250 ppm) from the start, and/or provide the ability to reduce the calcium hardness levels of existing water without having to drain the pool or spa. In one illustrative embodiment, an ion exchange resin-filled bag is strategically placed in the pool or spa during fill so that the mineral-laden water under pressure can flow through the resin-filled bag, allowing for exchange of the higher levels Ca or Mg ions with safe and harmless Na or other ions. The resin-filled bag may also be placed in the water to remove calcium over time through diffusion through the bag. The illustrative embodiment provides for a controlled reduction of calcium hardness to levels necessary for proper balanced water (0 ppm to 250 ppm). The depleted ion exchange resin bag can be regenerated for further Ca hardness reduction by use of a 10% sodium chloride aqueous solution rinse. In other embodiments, various ion exchange resins can be used to also reduce or remove harmful metal ions such as iron, copper and manganese while also still reducing calcium hardness.

Figure 1:
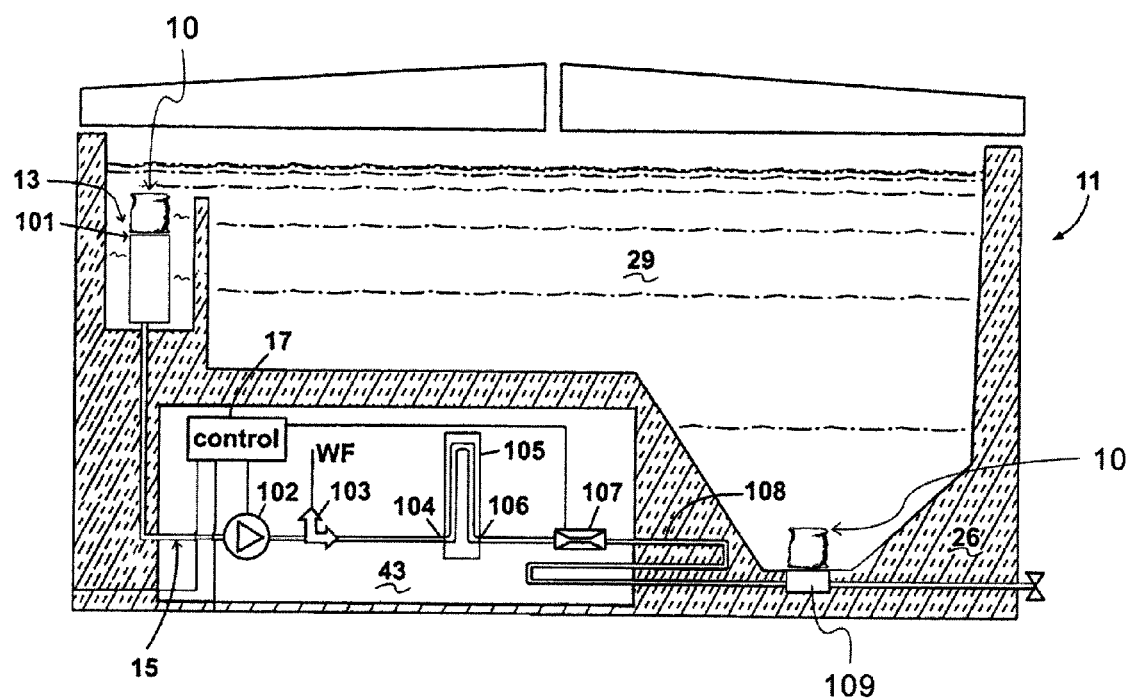
FIG. 1 is a schematic cross-sectional view of a portable spa apparatus where illustrative embodiments of the invention may find application.

FIG. 1 shows a first embodiment of a portable spa 11 wherein an ion exchange resin-filled bag or bags 10 may be strategically placed. The spa 11 includes a water circulation, purification and heating system which includes a filter compartment or "filter bucket" 13 containing a filter element 101. In the system of FIG. 1, spa water 29 passes through a circulation pipe 15 to a circulation pump 102 located in an equipment compartment 43 within surrounding insulation (foam) 26. A "T" junction 103 may be provided to supply water to a water feature such as a waterfall.

The circulation pump 102 further pumps the spa water through a "no fault" heater 105, with which are associated a regulating sensor 104 and a hi-limit sensor 106. An ozone generator and associated injector or other water purification apparatus 107 is also positioned in the return flow path to the spa 11, which may comprise an 8 to 10 foot contact chamber 108 and a spa inlet 109 where a circulation return jet is created. A secondary drain 10 may also be provided. An electronic control unit 17 controls the pump 102 and ozone generator 107, as well as other accessories which may be provided as part of the spa 11. FIG. 1 illustrates placement of a resin-filled bag 10 in the filter bucket 13 and also adjacent the circulation return jet at the spa inlet 109.

Figure 2:
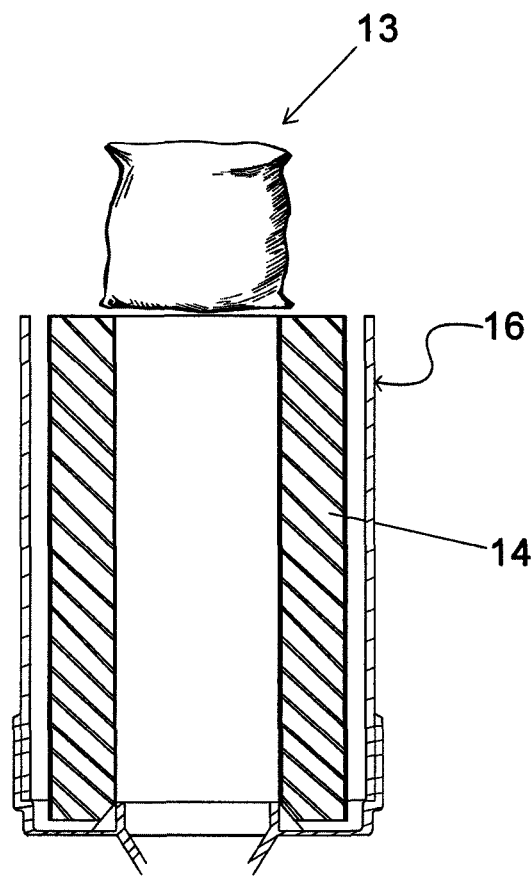
FIG. 2 is a cross-sectional view of a filter compartment or "bucket" with a resin-filled bag disposed therein.

FIG. 2 shows an illustrative embodiment wherein an ion exchange resin-filled bag 13 resides in a filter bucket 16 of, for example, a portable spa 11 such as illustrated in FIG. 1. In one embodiment, the filter bucket 16 may be a conventional filter bucket traditionally manufactured as part of the original spa equipment wherein one or more conventional filter elements 14 are placed. The resin-filled bag 13 may be formed of a water permeable fabric or other material, for example, such as polypropylene, polyester, cotton, rayon, polyethylene, nylon, PTFE (Teflon), polyacrylonitrile, or acrylic.

In various embodiments, the fabric type may be woven, nonwoven, felt, or mesh of a thickness of, for example, 0.01"-0.25". Illustrative porosities range from 10 micron to 500 microns.

In operation of the embodiment of FIG. 2, when the water circulation pump 102 of the portable spa is activated, water is drawn into the filter bucket 16 and through the resin-filled bag 13, thereby initiating ion exchange and reduction in the levels of calcium or other deleterious minerals.

Figure 3:
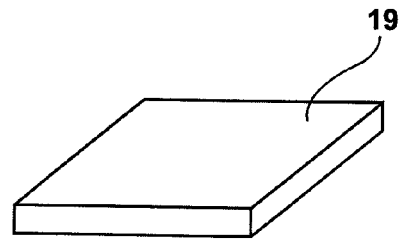
FIG. 3 is a perspective view of one embodiment of a rectangular resin-filled bag.
Figure 4:
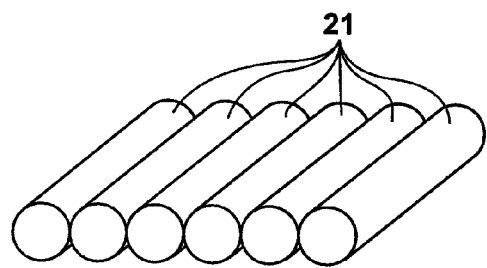
FIG. 4 is a schematic perspective view illustrating a baffled resin-filled bag.
Figure 5:
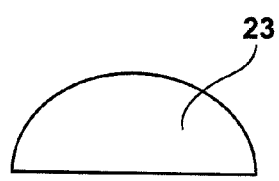
FIG. 5 is a side view of a semi-spherical resin-filled bag.
Figure 6:
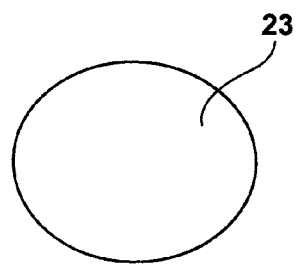
FIG. 6 is a top view of the bag of FIG. 5.
Figure 7:
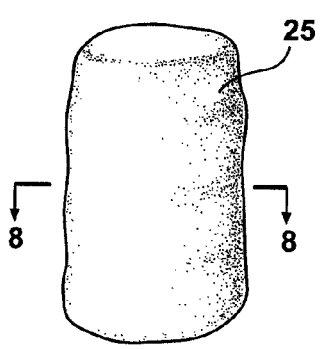
FIG. 7 is a perspective view of a generally cylindrical resin-filled bag.
Figure 8:
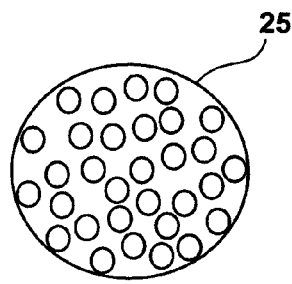
FIG. 8 is a sectional view taken at 8-8 of FIG. 7.

In one embodiment, shown in FIGS. 3 and 4, a resin-filled bag 19 may be rectangular in shape with a cross section of 0.25"-2". The surface area of such a bag 19 may be divided into baffles 21 as shown in FIG. 4 to increase surface area exposure. In the embodiment of FIGS. 5 and 6, a resin-filled bag 23 is formed in the shape of a semi-sphere. FIGS. 7 and 8 illustrate a cylindrical resin-filled bag or "sock" 25.

Figure 9:
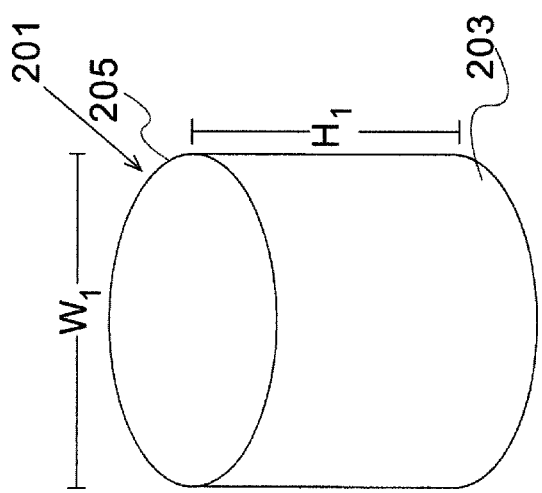
FIG. 9 is a perspective view of a cylindrical resin-filled bag.
Figure 11:
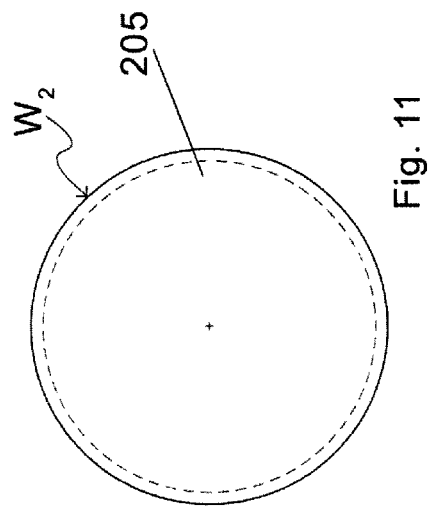
FIG. 11 is a top view of a component for forming the top and bottom of the bag of FIG. 9.
Figure 10:
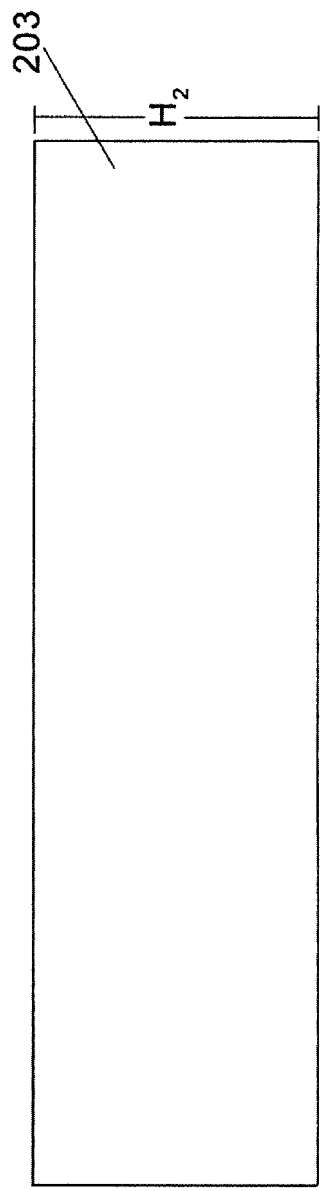
FIG. 10 is a side view of a side component of the bag of FIG. 9.

FIG. 9-11 illustrate fabrication of one illustrative embodiment of a cylindrical resin-filled bag or sock 201, shown in an assembled state in FIG. 9. The bag 201 is formed by stitching together a rectangular side piece 203 (FIG. 10) and identical circular top and bottom pieces 205 (FIG. 11). The top and bottom pieces 205 are sewn into place and the bag 201 is filled with resin through a side seam, which is thereafter sewn shut.

Dimensions of one illustrative embodiment of the bag 201 shown in FIGS. 9-11 are as follows in inches:

Diameter W1=7 Diameter W2—7.5

Height H1=5.5 Height H2=6.0

In other embodiments, the height H1 may range from 3 to 7 inches and the diameter W1 may range from 6 to 10 inches. The fabric of such an embodiment may be 200 micron pore polyester or polyethylene filter felt or automotive upholstery felt with a natural, singed or glazed finish. In other embodiments, the porosity may range from 20 to 300 microns. Other dimensions, materials and resins may be used in alternate embodiments. The shape of the bag 201 may also be varied, such as square or a water droplet in shape, i.e., a flat bottom with a convex top.

In one embodiment the volume of the bag 201 is about 3.5 liters and is filled with about 2.75 liters of strong cation resin. Partial filling of the bag 201 accommodates swelling of the resin as it is hydrated and permits the resin to float to create a fluidized bed which increases efficiency of the ion exchange process.

In one embodiment, such a cylindrical bag 201 may be used to maintain a water hardness of 50-100 ppm in spas formed of acrylic or other materials which are not adversely affected by low levels of calcium hardness. Such a bag 201 may be placed over the heater return in a spa footwell (e.g. 109, FIG. 1), flipped over after twelve hours, and then removed after 12 more hours with the spa jets held off during the 24 hour period. Alternately, a bag 201 may be placed over a spa jet suction fitting providing sufficient suction to hold the bag 201 in place, whereafter the low speed jet pump is activated for one to three hours or until a spa water test indicates the desired 50-100 ppm level has been reached. Depending on circumstances, multiple bags/applications may be needed to achieve the target hardness using either approach.

Figure 12:
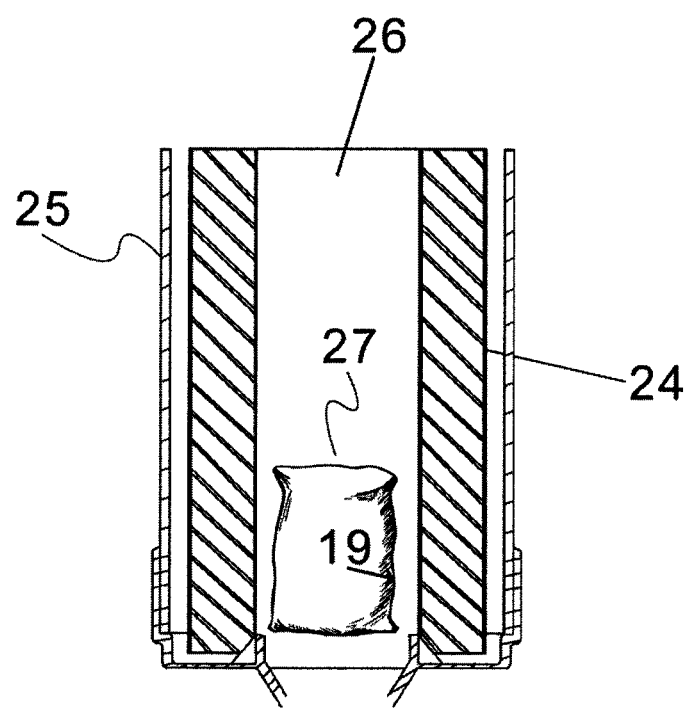
FIG. 12 is a cross-sectional view of a filter compartment with a resin-filled bag disposed within a filter element.
Figure 13:
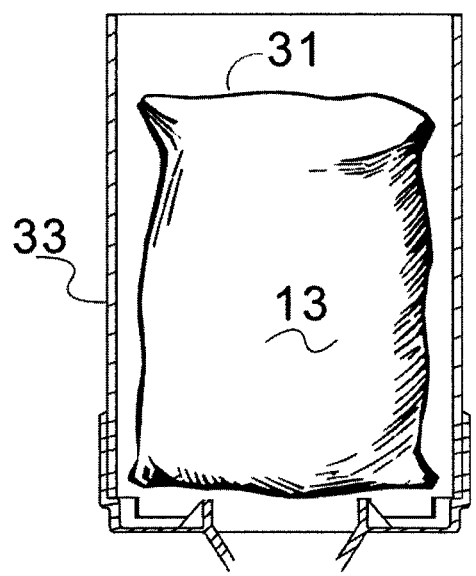
FIG. 13 is a cross-sectional view of an alternate filter bucket embodiment.

In various other embodiments, resin-filled bags as disclosed herein may be placed in underwater areas of pools and spas such as basins, foot wells, floors, steps, seats, and other flat areas or in water pressurized areas of pools and spas such as filter housings, skimmers, heater returns, main-drains, pump baskets, and flow paths. FIG. 12 illustrates a resin-filled bag 27 placed within the central cylindrical opening 26 in an annular filter element 24 located in a filter bucket 25, while FIG. 13 illustrates a resin-filled bag 31 occupying the entire space of a filter bucket 33. An annular or doughnut shaped bag could also be positioned in the filter bucket 33. The ion exchange resins in the resin bags may be regenerated by using a 10% aqueous solution of sodium chloride as a resin rinse.

Figure 14:
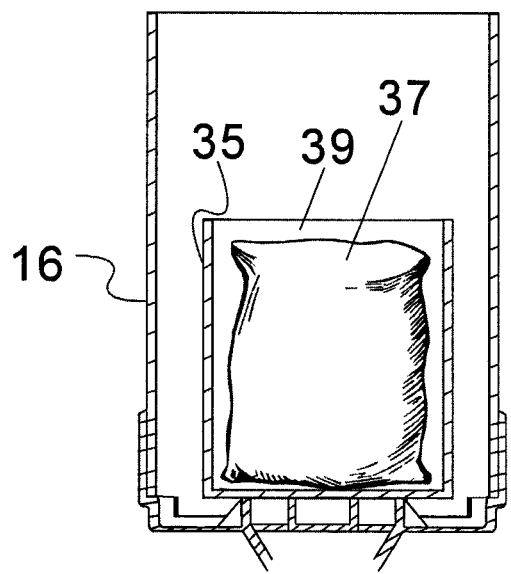
FIG. 14 is a cross-sectional view of a "sock holder" embodiment.

FIG. 14 illustrates an alternate embodiment employing a cylindrical sock holder 35, which temporarily replaces a filter element, for example, such as the filter element 101 of FIG. 1. To install, the filter element 101 may be unscrewed or otherwise removed from filter bucket 16, and a sock holder 35 screwed in or otherwise installed in its place. A resin sock or bag 37 is then placed in the cylindrical cavity 39 of the sock holder. This arrangement promotes flow of spa water under pressure through the sock 37, resulting in enhanced efficiency of the calcium removal operation.

In illustrative embodiments, the spa size and holding capacity of the resin dictates the amount of resin required and hence the bag size. The resin bag is left in the spa long enough to bring the spa to the desired level of 0-225 ppm calcium. Depending on location of the bag in the spa, it can take several days to remove the calcium.

Thus, according to various embodiments, strong acid cation resins used alone or in combination with zeolite-based ion exchange resins may be encapsulated in various water permeable polymer fabric bags and packed in various resin thicknesses to reduce calcium hardness levels during swimming pool and spa water fills or operation. The resin bags are strategically placed in the pool or spa to allow water to flow under pressure through the ion exchange media to exchange calcium or magnesium ions with sodium or other harmless cations.

Those skilled in the art will appreciate from the foregoing that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
   a flexible, water permeable bag;
   a quantity of chemical-removing ion exchange resin contained within the bag, the quantity of resin and the size of the bag being selected such that the resin-filled bag may be readily inserted by hand into a selected location within a water filled pool or spa to effectively remove one or more undesired chemicals from the water; and
   wherein said bag is filled with a quantity of resin selected to accommodate swelling and to provide floating of the resin within the bag so as to create a fluidized bed therein.

2. Apparatus comprising:
   a water filled spa;

a filter bucket disposed in said spa; and a chemical removing ion exchange resin-filled bag disposed in said bucket.

3. The apparatus of claim 2 wherein the quantity of chemical-removing ion exchange resin and the size of the bag are selected such that the resin-filled bag may be readily inserted by hand into said filter bucket within a pool or spa to effectively remove one or more undesired chemicals from the spa water.

4. An apparatus comprising:

a cylindrical, flexible, water permeable felt bag having a 20-300 micron porosity, a height in the range of 3 to 7 inches and a diameter in the range of 6 to 10 inches; and a quantity of acid cation exchange resin filling said bag, whereby the resin-filled bag may be readily inserted by hand into a selected location within a pool or spa to effectively remove one or more undesired chemicals; and wherein said bag is filled with a quantity of resin selected to accommodate swelling and to provide floating of the resin within the bag so as to create a fluidized bed therein.

5. The apparatus of claim 4 further comprising:

a portable spa wherein the resin-filled bag is placed over a heater return of the portable spa.

6. The apparatus of claim 4 further comprising a portable spa and wherein the resin-filled bag is placed over a spa jet suction fitting of the portable spa.

7. A method of removing calcium from spa water in a spa comprising:

placing a water permeable, acid cation resin-filled bag in the spa water over a heater return of the spa; and allowing said bag to remain in said water until a water hardness level of 50 to 100 ppm is achieved.

8. The method of claim 7 wherein said resin-filled bag comprises:

a cylindrical, flexible, water permeable felt bag having a 20 to 300 micron porosity, a height in the range of 3 to 7 inches and a diameter in the range of 6 to 10 inches; and a quantity of acid cation exchange resin filling said bag.

9. A method of removing calcium from spa water in a spa comprising:

placing a water permeable, acid cation exchange resin-filled bag in the spa over a spa jet fitting; and allowing said bag to remain in position over said fitting while a jet pump is activated in said water until a water hardness level of 50 to 100 ppm is achieved.

10. The method of claim 9 wherein said bag comprises:

a cylindrical, flexible, water permeable felt bag having a 20 to 300 micron porosity, a height in the range of 3 to 7 inches and a diameter in the range of 6 to 10 inches; and a quantity of acid cation resin filling said bag.

11. The apparatus of claim 4 wherein said height is 5 inches and said diameter is 7 inches.

12. The apparatus of claim 4 wherein said height is 9 inches and said diameter is 7 inches.

13. The apparatus of claim 4 wherein said height is 11 inches and said diameter is 7 inches.

14. The apparatus of claim 11 wherein the bag porosity is 200 microns.

15. The apparatus of claim 12 wherein the bag porosity is 200 microns.

16. The apparatus of claim 13 wherein the bag porosity is 200 microns.

\* \* \* \* \*